(12) United States Patent
Doi et al.

(10) Patent No.: US 9,315,372 B2
(45) Date of Patent: Apr. 19, 2016

(54) GREASE PUMP UNIT

(75) Inventors: Hiroyuki Doi, Koto-ku (JP); Hirokazu Tanaka, Koganei (JP)

(73) Assignees: IHI COMPRESSOR AND MACHINERY CO., LTD., Tokyo (JP); KOGANEI CORPORATION, Tokyo (JP)

( * ) Notice: Subject to any disclaimer, the term of this patent is extended or adjusted under 35 U.S.C. 154(b) by 188 days.

(21) Appl. No.: 14/009,704

(22) PCT Filed: Jan. 17, 2012

(86) PCT No.: PCT/JP2012/000233
§ 371 (c)(1),
(2), (4) Date: Oct. 3, 2013

(87) PCT Pub. No.: WO2012/137393
PCT Pub. Date: Oct. 11, 2012

(65) Prior Publication Data
US 2014/0020768 A1    Jan. 23, 2014

(30) Foreign Application Priority Data

Apr. 4, 2011 (JP) .................................. 2011-082546

(51) Int. Cl.
| B67D 7/36 | (2010.01) |
| B67D 7/04 | (2010.01) |
| F16N 7/38 | (2006.01) |
| F16N 11/10 | (2006.01) |
| F16N 25/00 | (2006.01) |

(52) U.S. Cl.
CPC ........ *B67D 7/04* (2013.01); *F16N 7/385* (2013.01); *F16N 11/10* (2013.01); *F16N 25/00* (2013.01); *Y10T 137/2931* (2015.04)

(58) Field of Classification Search
CPC ........... B67D 7/04; F16N 11/10; F16N 25/00; F16N 7/385; F16N 7/38; Y10T 137/2931

USPC .......... 137/171–204, 565.01–565.36; 417/99, 417/258, 396, 397, 398; 222/160, 327, 386, 222/259, 260; 431/398, 397, 396
See application file for complete search history.

(56) References Cited

U.S. PATENT DOCUMENTS 2,482,806 A * 9/1949 Stahn ........................... 184/6.23
2,934,102 A * 4/1960 Martin .......................... 141/21
(Continued)

FOREIGN PATENT DOCUMENTS

| JP | 2001 234851 | 8/2001 |
| JP | 2009191878 A * | 8/2009 |

OTHER PUBLICATIONS

International Search Report Issued Mar. 13, 2012 in PCT/JP12/000233 Filed Jan. 17, 2012.

*Primary Examiner* — Craig Schneider
*Assistant Examiner* — Angelisa L Hicks
(74) *Attorney, Agent, or Firm* — Oblon, McClelland, Maier & Neustadt, L.L.P

(57) ABSTRACT

A grease pump unit has a metering valve 37 and a grease supplying device 50 in which a suction tube 16 on a pump device 11 extends through a follower plate 19 in a grease can 100, grease in the grease can 100 being sucked through the suction tube 16 and discharged through a discharge port 17 by activation of the pump device 11. Provided are a bubble dividing device 32 which supplies the grease discharged through the discharge port 17 through an supply pipe 24 to micronize bubbles in the grease and which supplies the grease through a supply pipe 36 to the metering valve 37, and a return pipe 47 which returns a portion of the grease not discharged through the metering valve 37 into the grease can 100 via the follower plate 19.

5 Claims, 4 Drawing Sheets

(56) References Cited

U.S. PATENT DOCUMENTS

| | | | |
|---|---|---|---|
| 3,193,988 A * | 7/1965 | Kudlaty | 96/174 |
| 5,085,677 A * | 2/1992 | Ville et al. | 96/210 |
| 5,449,051 A * | 9/1995 | Liao | 184/55.1 |
| 5,494,191 A * | 2/1996 | Benson | 222/23 |

* cited by examiner

GREASE PUMP UNIT

TECHNICAL FIELD

The present invention relates to a grease pump unit which can supply grease in a grease can to a metering valve at an oiling site with bubbles in the grease being micronized, and can return a portion of the grease not consumed by the metering valve into the grease can for circulation to suppress oil separation in the grease.

BACKGROUND ART

Conventionally used is a lubricating pump installed on a grease can to supply grease in the grease can to a metering valve or the like on machinery and equipment at an oiling site (see Patent Literature 1).

In the lubricating pump of the Patent Literature 1, a lid on which a suction unit is integrally arranged can be placed on a grease can to close an opening of the can. A suction pipe extends downward from the lid and is in communication with the suction unit. A follower plate is vertically movably suspended by ball chains from the suction pipe, has a central through bore through which the suction pipe fittingly extends and is contacted at an outer periphery thereof with an inner surface of the grease can.

Upon use of such lubricating pump, the flower plate is fitted into the opened grease can so as to be closely contacted with the grease in the grease can, and the lid with the suction unit is fitted on an upper end of the grease can with the suction pipe extending through the central through bore of the follower plate. Driving of the suction unit with such set state causes the grease in the grease can to be sucked through the suction pipe to the metering valve at the oiling site. Decrease of the grease in the grease can is accompanied by lowering of the follower plate, and the grease supply is stopped when the follower plate is lowered to a bottom of the grease can. In the lubricating pump of Patent Literature 1, almost all of the grease in the grease can may be sucked and supplied by use of the follower plate. After the grease supply is finished, the suction unit is lifted up to raise the suction pipe, and the follower plate is pulled up and taken out from the empty grease can.

However, the suction of the grease in the grease can by the suction unit may cause minute bubbles intermingling in the grease to be agglomerated into large-diameter bubbles. Such large-diameter bubbles supplied to the metering valve may disadvantageously make the grease supply intermittent by the metering valve to the machinery and equipment at the oiling site, resulting in serious failure of unmaintained stable lubricating performance to the machinery and equipment which are required to be always volumetrically supplied with the grease in a minute amount. There is also a problem that, after the grease can is opened, the grease therein is changed in quality by oxidization through contact with ambient air and oil separation through gravity.

There is a grease supplying device for prevention of the above-mentioned large-diameter bubbles from being produced (see Patent Literature 2).

In the grease supplying device in Patent Literature 2, grease in a grease can is supplied by a pressure pump to a bubble dividing device in a grease regulation unit. In the bubble dividing device, the grease from the pressure pump is passed through minute passages of a porous member to divide the bubbles. The bubbles of the grease passed through the minute passages are further divided by a porous moving member moving along an outlet surface of the porous member. The grease with the bubbles micronized by the division is supplied to the metering valve. The grease regulation unit is provided with a porous nozzle through which the storage tank is filled with the grease branched from an outlet of the bubble dividing device via a circulation passage so as to attain micronization of the bubbles and mixing of the grease as well as a supply pump which supplies the grease in the storage tank to the metering valve via the bubble dividing device.

According to the grease supplying device of Patent Literature 2 mentioned above, the grease is supplied with the bubbles therein being micronized by the bubble dividing device, so that prevented is the problem of intermittent grease supply by the metering valve to the machinery and equipment at the oiling site. Moreover, the circulation of the grease to the closed storage tank contributes to effective mixing of the grease and prevents change in quality of the grease such as oil separation.

CITATION LIST

Patent Literature

[Patent Literature 1] JP 2001-234851A
[Patent Literature 2] JP 2009-191878A

SUMMARY OF INVENTION

Technical Problems

However, in the grease supplying device of Patent Literature 2, the grease in the grease can is supplied by the pressure pump to the bubble dividing device in the grease regulation unit, and the grease with the bubbles micronized is supplied to the metering valve. The storage tank is filled with the grease branched from the outlet of the bubble dividing device through the pores of the nozzle so as to attain micronization of the bubbles and mixing of the grease, and the grease in the storage tank is supplied by the supply pump to the bubble dividing device. Thus, there is a problem that a whole structure of the grease regulation unit is large-sized and complicated in structure.

The grease from the bubble dividing device is only supplied to the metering valve through the supply pipe. Thus, stop of the metering valve causes stagnation of the grease in the supply pipe between the bubble dividing device and the metering valve. Thus, during the stagnation of the grease in an amount, oil separation and/or bubble agglomeration may be caused.

The invention was made in view of the above and has its object to provide a grease pump unit which can supply grease in a grease can to a metering valve at an oiling site with bubbles in the grease being micronized, and can return a portion of the grease not consumed by the metering valve into the grease can for circulation so as to suppress oil separation in an all amount of the grease in the grease can and in the supply pipe.

Solution to Problems

The invention is directed to a grease pump unit comprising a grease supplying device with a pump device vertically moved by a lifter standing on a pedestal on which a grease can is installed, a suction tube of said pump device extending through a follower plate airtightly fitted into said grease can, the grease in said grease can being sucked into said suction tube and discharged through a discharge port by activation of said pump device, and a metering valve, characterized in that it comprises a bubble dividing device for introducing the grease discharged through said discharge port through an supply pipe to micronize bubbles in the grease and for supplying the grease through the supply pipe to said metering valve, and a return pipe for returning a portion of the grease not discharged through the metering valve into said grease can via said follower plate.

In said grease pump unit, said metering valve may comprise a single valve body, said return pipe being connected to the supply pipe which connects said single valve body with said bubble dividing device, at a position adjacent to a supply port of said valve body.

In said grease pump unit, said metering valve may comprise a plurality of valve bodies connected in series by a manifold, said return pipe being connected to an outlet of the manifold.

In said grease pump unit, said return pipe may be opened at a position adjacent to a bottom of the grease can.

In said grease pump unit, said return pipe may be opened at a position below the through portion of the follower plate.

Advantageous Effects of Invention

A grease pump unit of the invention can exhibit excellent effects. Grease in a grease can on a pedestal is sucked through a suction tube of a vertically moving pump device into a bubble dividing device where bubbles in the grease are micronized, the grease with bubbles thus micronized being supplied to a metering valve; thus, with the simple structure, prevented is a problem of the grease with the large-diameter bubbles being supplied to the metering valve. A portion of the grease not discharged through the metering valve is returned by the return pipe through the follower plate into the grease can; thus, the grease in all the supply pipe is circulated without stagnancy even if the metering valve is stopped and the oil separation of the grease is suppressed.

Figure 1:
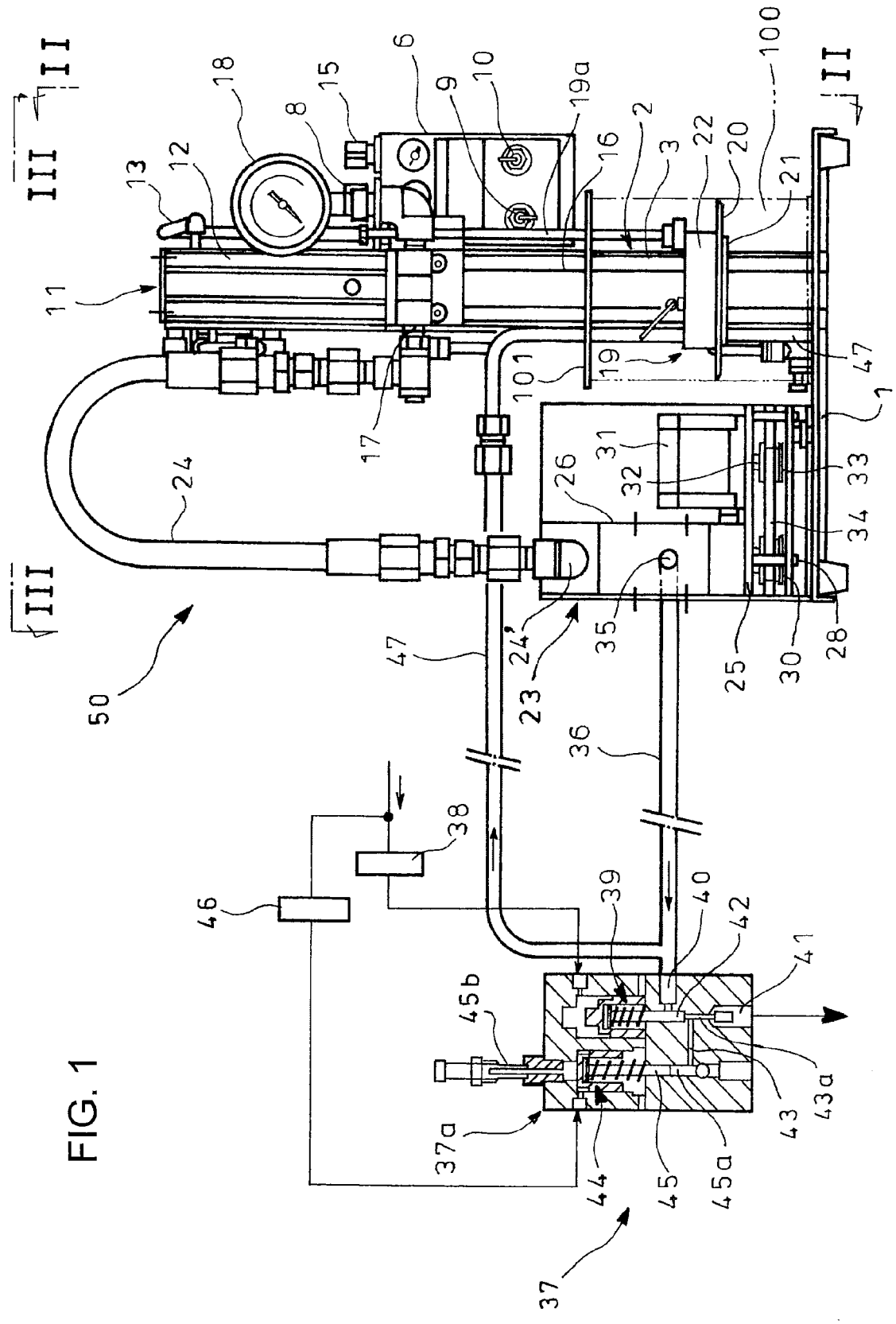
FIG. 1 is an overall front view showing an embodiment of a grease pump unit according to the present invention.

REFERENCE SIGNS LIST 1 pedestal
2 lifter
11 pump device
16 suction tube
17 discharge port
19 follower plate
23 bubble dividing device
24 supply pipe
36 supply pipe
37 metering valve
40 supply port
47 return pipe
48 metering valve with manifold
49 outlet
50 grease supplying device
M manifold

DESCRIPTION OF EMBODIMENT

An embodiment of a grease pump unit according to the invention will be described in conjunction with the drawings.

Figure 2:
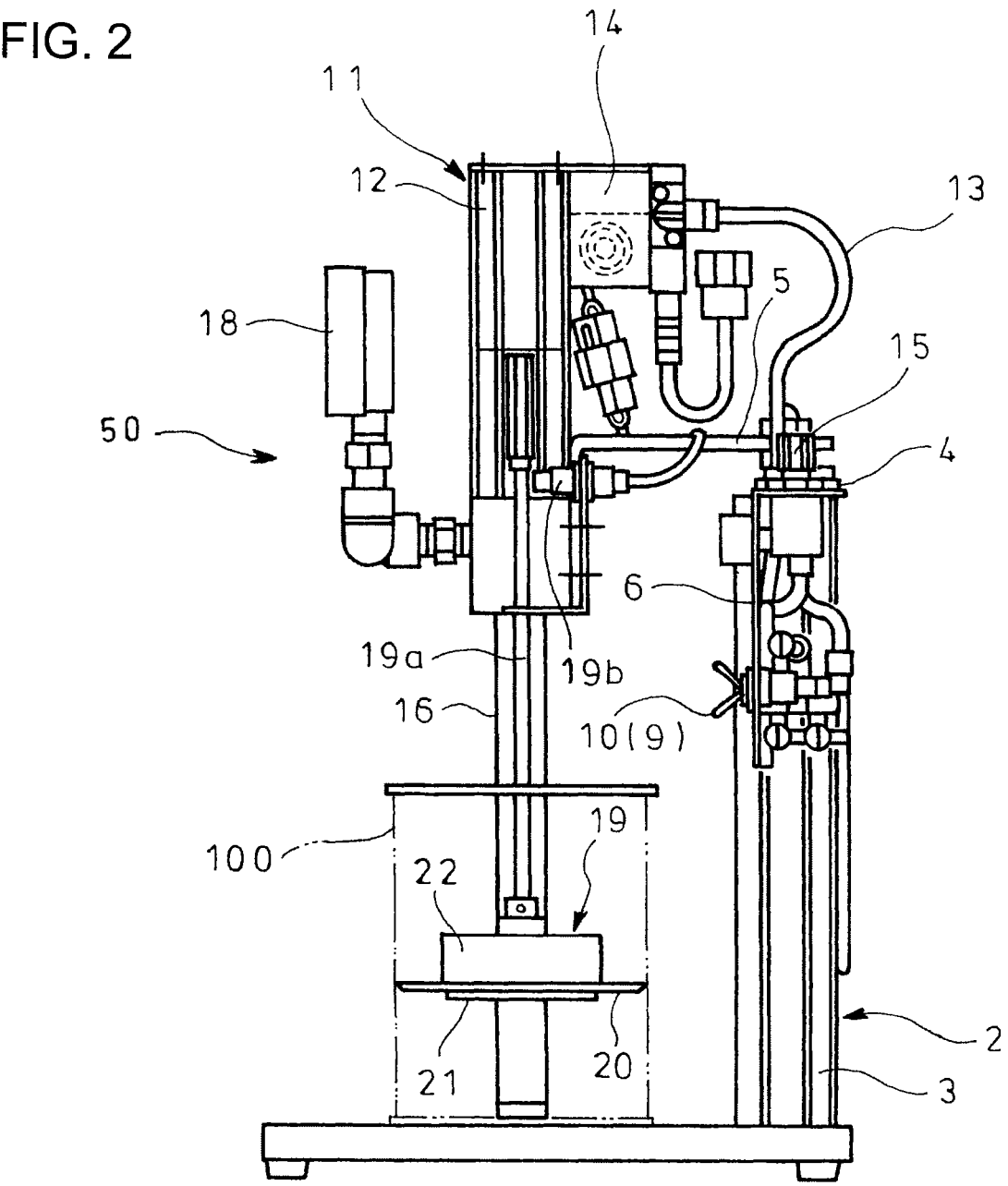
FIG. 2 is a side view looking in a direction of arrows II in FIG. 1.
Figure 3:
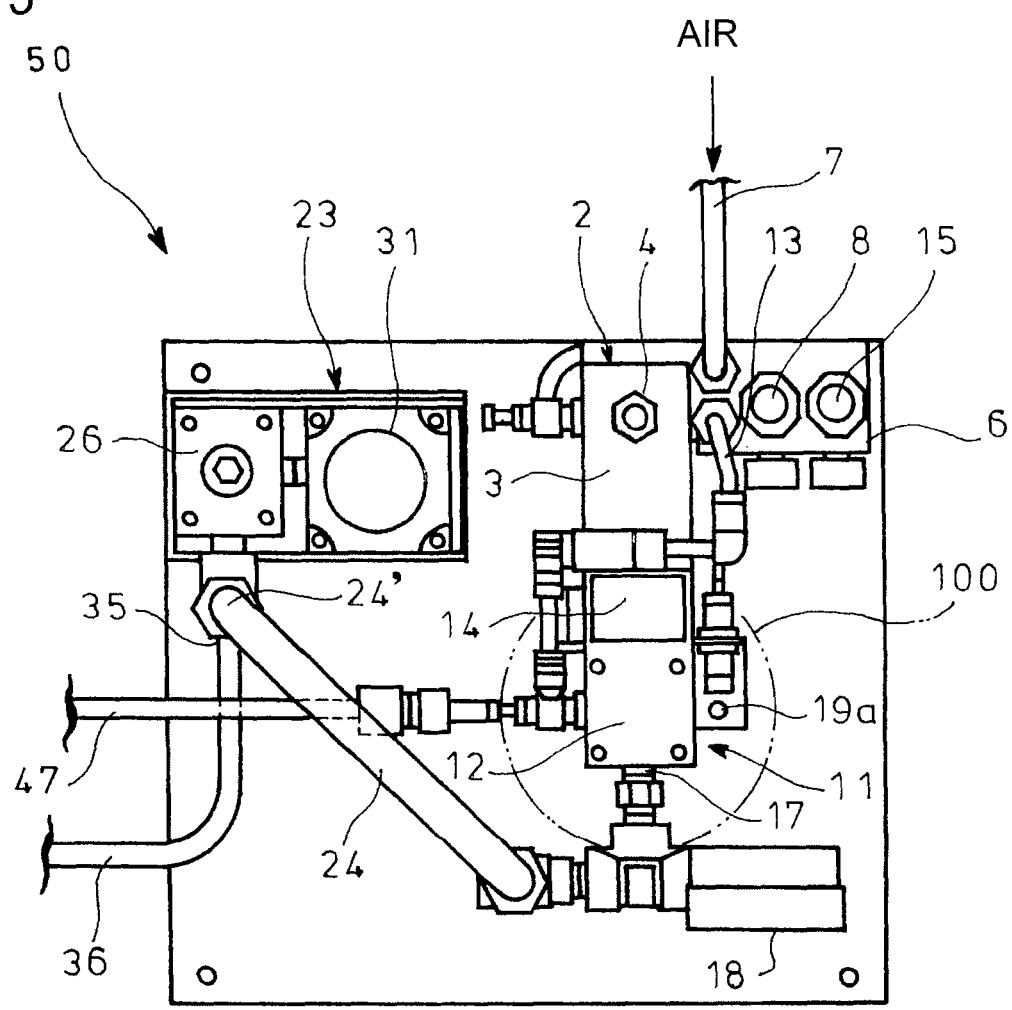
FIG. 3 is a plan view looking in a direction of arrows III in FIG. 1.

FIG. 1 is an overall front view showing the embodiment of the grease pump unit according to the invention. FIG. 2 is a side view looking in a direction of arrows II in FIG. 1. FIG. 3 is a plan view looking in a direction of arrows III in FIG. 1. The grease pump unit comprises a grease supplying device 50 and a metering valve 37.

The grease supplying device 50 has a pedestal 1 on which a grease can 100 is installed, and a lifer 2 stands on a back side of the pedestal 1. The lifter 2 illustrated is an air cylinder 3. The air cylinder 3 has an upwardly protruding cylinder rod 4 with an upper end to which secured is a vertically movable member 5 in the form of an L-shaped plate. The cylinder rod 4 of the air cylinder 3 is driven into protrusion and retraction with compressed air supplied through an air pipe 7 (FIG. 3) connected to an operation panel 6 arranged outside. Arranged on the operation panel 6 are a vertical movement regulator 8 which regulates an operating air pressure of the air cylinder 3 for protrusion and retraction of the cylinder rod 4 so as to maintain a vertical movement speed of the vertically movable member 5 to a predetermined value, a changeover switch 9 for changeover of lifting/lowering of the cylinder rod 4 and an inching switch 10 for inching movement of the cylinder rod 4.

Fixed to the vertically movable member 5 is a pump device 11 which has a driving cylinder 12 secured to the vertically movable member 5. The driving cylinder 12 has therein a piston (not shown) which is lifted/lowered by changeover by a solenoid valve 14 of compressed air supplied from an air pipe 13 connected to the operation panel 6. In FIG. 1, reference numeral 15 denotes a regulator for the pump arranged on the operation panel 6 to regulate the operating air pressure of the driving cylinder 12 so as to set a discharging pressure of the grease depending upon, for example, properties of the grease.

A suction tube 16 extends downward from the driving cylinder 12 and has therein a vertically movable valve body (not shown) connected to the piston. Vertical movement of the piston causes the grease in the grease can 100 to be sucked through a suction port at a lower end of the suction tube 16 by the action of the valve body, and to be discharged through a discharge port 17 at an upper end of the suction tube 16. In FIG. 1, reference numeral 18 denotes a pressure meter for the grease discharged.

Adapted to be airtightly fitted in and taken out from the grease can 100 is a follower plate 19 which comprises a circular rubber plate 20 with a size to be airtightly fitted into the grease can 100 and sandwiched by a lower metal plate 21 (steel plate) and an upper weight 22 which are smaller in diameter than the rubber plate 20, the follower plate 19 having a central through bore with a seal ring so as to make the suction tube 16 airtightly extending through the through bore. Thus, the follower plate 19, which is closely contacted with a grease surface due to its own weight, sucking force of the pump device 11 and surface tension of the grease, is lowered as the grease is consumed. The weight 22, which is arranged for grease with a high hardness, may be omitted when the grease is soft in property. The suction tube 16 has a transparent lid member 101 through which the suction tube 16 extends. The lid member 101 covers the opened grease can 100 to prevent any foreign matter from entering into the grease can 100 and allows observation inside of the grease can 100 through the lid member 101. The driving cylinder 12 has a level rod 19a extending through the lid member 101 and attached at a lower end thereof with a magnet or the like to the weight 22 on the follower plate 19 so as to be vertically movable together with the follower plate 19, the level rod 19a serving for detecting a height position of the follower plate 19 (a remaining grease amount). The vertically movable member 5 is provided with a low level switch 19b which detects an upper end of the level rod 19a. When the remaining grease amount becomes zero, the low level switch 19b detects the same to stop the pump device 11 and output an abnormal signal to a controller.

Arranged on the pedestal 1 of the grease supplying device 50, on the left in FIG. 1, is a bubble dividing device 23 into which the grease discharged through the discharge port 17 at an upper end of the suction tube 16 is supplied through a supply pipe 24.

Figure 4:
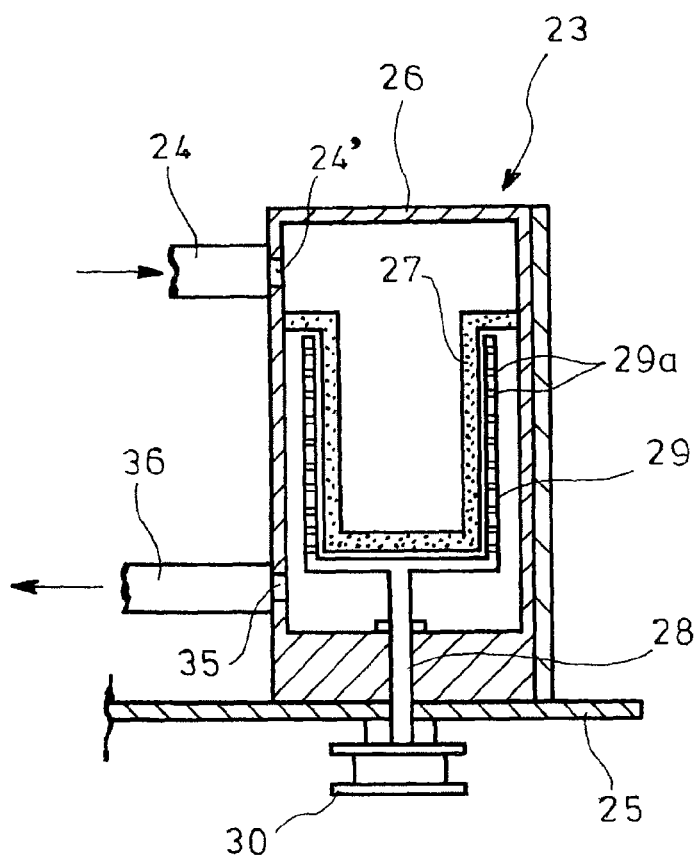
FIG. 4 is a sectional view exemplarily showing a bubble dividing device.

FIG. 4 exemplarily shows the bubble dividing device 23 comprising, as shown in FIGS. 1 and 4, a vessel body 26 arranged on a table member 25 which in turn is adapted to be fixed on the pedestal 1. Secured to an inside of the vessel body 26 is a porous, downwardly concave cylindrical member 27 which receives the grease from the supply pipe 24 through an upper inlet 24' and which has a lower periphery surrounded with a slight gap by a porous cylindrical rotary member 29 fixed to a rotary shaft 28 extending through a bottom center of the vessel body 26. The rotary shaft 28 is provided, at a lower end thereof, with a pulley 30. Arranged on the table member 25 sidewise of the vessel body 26 is a driving motor 31 which has a lower drive shaft 32 with a pulley 33 at a lower end thereof. A belt 34 is wrapped around the pulleys 30 and 33 so that the porous cylindrical rotary member 29 is rotated by the driving motor 31. In the figure, reference numeral 35 denotes a discharge port through which the grease is discharged from a space below the porous cylindrical rotary member 29.

The porous cylindrical member 27 has minute passages provided, for example, by cylindrically sintered metal particles or by a great number of minute diametrical through pores on a periphery of the cylindrical member; the minute passages may be of a size, for example, of the order of 10-60 meshes. The porous cylindrical member 27 may be easily replaced with that with different meshes depending upon properties of the greases and therefore is applicable to a broad range of greases.

The porous cylindrical rotary member 29 used may be of a type having on its periphery a great number of pores 29a greater in size than the minute passages and having diameter of the order of, for example, 2-10 mm, and may be rotated at a speed of the order of, for example, 60-100 r.p.m.

The bubble dividing device 23 shown in FIG. 4 is of a type having the porous cylindrical member 27 for division of the bubbles by passing of the grease through the minute passages and the porous cylindrical rotary member 29 moving along the outer periphery of the porous cylindrical member 27 to divide the bubbles in the grease having passed through the minute passages of the porous cylindrical member 27; bubble-in-grease division effect can be similarly exhibited by arranging the porous cylindrical rotary member 29 inside of the porous cylindrical member 27. Shown in FIG. 1 is a case where the bubble dividing device 23 is installed on the pedestal 1 of the grease supplying device 50; alternatively, the bubble dividing device 23 may be arranged separately of the grease supplying device 50.

The grease discharged through the discharge port 35 of the bubble dividing device 23 is supplied through the supply pipe 36 to the metering valve 37. The metering valve 37 shown has a single valve body 37a comprising a changeover valve portion 39, a metering valve portion 44 and a communication passage 43 for communication therebetween. The changeover valve portion 39 may take two positions, i.e., a discharge position into which a sub plunger 42 is moved downward in the figure by the compressed air supplied by a changeover valve 38 to attain communication between the metering valve portion 44 and a discharge port 41 and a suction position into which the sub plunger 42 is moved upward in the figure by spring force with the compressed air supplied by the changeover valve 38 being discharged to close the discharge port 41 and supply the grease entering through a supply port 40 to the metering valve portion 44 via a small-diameter portion 42a and the communication portion 43. The metering valve portion 44 sucks the grease entering through the communication passage 43 into a lower chamber 45a of a main plunger 45 by means of the main plunger 45 moved upward in the figure by spring force to thereby meter the grease; and the metered grease is discharged through the discharge port 41 by moving the main plunger 45 downward in the figure by the compressed air supplied from a changeover valve 46. In the figure, reference numeral 45b denotes an adjuster which adjusts an upper limit position of the main plunger 45 to vary a displacement amount of the main plunger 45, thereby properly adjusting a discharge amount of the grease. Exemplarily shown in FIG. 1 is the metering valve 37 comprising the single valve body 37a with the changeover valve portion 39, the metering valve portion 44 and the communication passage 43 therebetween in the valve; alternatively, the changeover valve 39 and the metering valve 44 are separately arranged to intercommunicate therebetween through the communication passage 43.

Branched from the supply pipe 36 just upstream of the supply port 40 of the metering valve 37 is a return pipe 47 which extends through the lid member 101 and the follower plate 19 and which has a lower end shown in FIG. 1 guided to and opened at a position adjacent to a bottom of the grease can 100. Alternatively, the return pipe 47 may be opened at a position where the pipe has extended through the follower plate 19, i.e., at a position below the follower plate.

Figure 5:
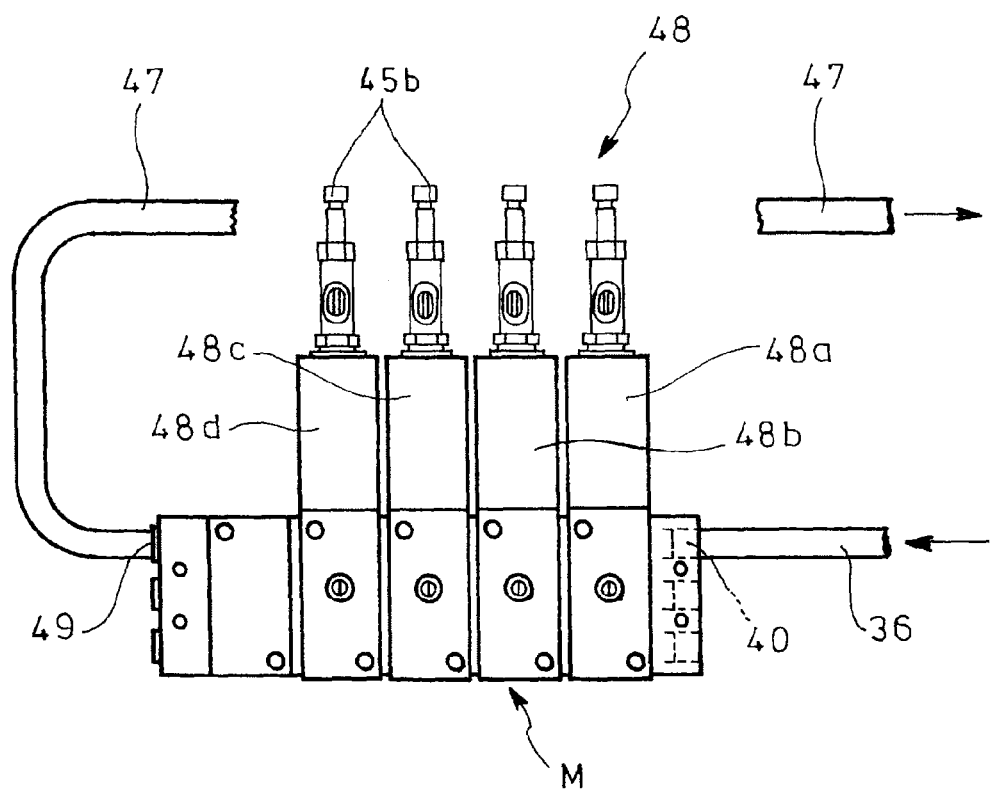
FIG. 5 is an explanatory view showing a metering valve with a manifold which is a modification of the metering valve shown in FIG. 1.

FIG. 5 shows a modification of the metering valve 37 in FIG. 1; shown is the metering valve having a manifold M for connection of a plurality of valve bodies 48a, 48b, 48c and 48d in series. The grease supplied from the supply pipe 36 to the supply port 40 of the manifold M is discharged through any of the valve bodies 48a, 48b, 48c and 48d by a changeover valve. An outlet 49 of the manifold M is connected with the return pipe 47, and a portion of the grease not discharged and not consumed through any of the valve bodies 48a, 48b, 48c and 48d is returned to the grease can 100.

Next, a mode of operation of the above-mentioned embodiment will be described.

For the grease supply by use of the grease pump unit, the grease can 100 with the lid being released and the follower plate 19 being airtightly fitted into the grease can from the upper opening is placed on the pedestal 1 under the condition that the cylinder rod 4 in the air cylinder 3 of the lifter 2 is expanded to lift up the pump device 11 and the suction tube 16. Then, the cylinder rod 4 of the air cylinder 3 is retracted to lower the pump device 11, the suction tube 16 and the return pipe 47; with the lower end of the suction tube 16 being aligned with the central through bore of the follower plate 19, the lower end of the suction tube 16 is inserted into the grease can 100 and is positioned at a position adjacent to the bottom of the can.

Then, the compressed air is supplied to the pump device 11 for driving of the same to suck the grease in the grease can through the lower end of the suction tube 16. The grease sucked through the suction tube 16 is discharged through the discharge port 17 at the upper end into the supply pipe 24 and is supplied through the inlet 24' into the bubble dividing device 23.

The grease supplied into the bubble dividing device 23 is supplied to the porous cylindrical member 27. By passing of the grease through the minute passages of the porous cylindrical members 27, the large-diameter bubbles are micronized. Further, the porous cylindrical member 27 is surrounded at the outer periphery thereof with a slight gap by the porous cylindrical rotary member 29 rotated by the driving motor 31, so that the grease having passed through the minute passages of the porous cylindrical member 27 is sheared by the movement of the porous cylindrical rotary member 29 to further divide the bubbles, whereby micronization of the bubbles is further facilitated.

The grease with the micronized bubbles as mentioned above is supplied from the discharge port 35 shown in FIG. 1 through the supply pipe 36 to the metering valve 37 where the grease is quantitatively measured and is supplied through the discharge port 41 to the machinery and equipment at the oiling site. In this case, as mentioned above, the grease with the micronized bubbles is supplied to the metering valve 37, so that prevented is the intermittence of the grease supply from the metering valve 37 to the machinery and equipment due to the large-diameter bubbles.

Branched from the supply pipe 36 just upstream of the supply port 40 of the metering valve 37 is the return pipe 47 through which a portion of the grease not discharged through the metering valve 37 is returned to the grease can 100; as a result, when the grease supply through the metering valve 37 to the machinery and equipment is decreased or stopped, the portion of the grease not discharged is returned to the position adjacent to the bottom of the grease can 100. Thus, the mixing of the grease is facilitated by circulating the same in the sealed area with no contact with ambient air, so that oil separation in the grease is suppressed to suppress change of the grease in quality. Also in the case of the metering valve 48 with the manifold M shown in FIG. 5, the grease discharged through the outlet 49 of the manifold M is returned through the return pipe 47 to the grease can 100, so that just like in FIG. 1, change of the grease in quality is suppressed.

Here, in the case where the lower end of the return pipe 47 is opened at the position adjacent to the bottom of the grease can 100 as shown in FIG. 1, the opening of the return pipe 47 and the suction port at the tip end of the suction tube 16 are adjacent to each other near the bottom of the can, so that the grease with the bubble being micronized and with constituent separation being suppressed by the bubble dividing device 23 is sucked and discharged through the suction tube 16 relatively within a short time without long stagnation in the can. Thus, the grease returned to the grease can 100 with the bubbles being micronized by the bubble dividing device 23 are preferentially sucked through the suction tube 16 for consumption.

Alternatively, the return pipe 47 may be opened at a position where the pipe has extended through the follower plate 19, i.e., at a position below the follower plate. When a tip of the return pipe 47 is fixed at the position where it has extended through the follower plate 19, the return pipe 47 is lowered together with the follower plate 19 as the grease is consumed. In this case, the opening of the return pipe 47 fixed to the follower plate 19 is away from the suction port of the suction tube 16 opened to the bottom of the can, so that totally the grease in the grease can 100 is supplied to the bubble dividing device 23 and is returned through the return pipe 47 for circulation, thereby micronizing the bubbles in the whole grease and suppressing the constituent separation.

According to the embodiment of the invention, all the grease in the grease can 100, in the supply pipe 36 and in the return pipe 47 is circulated, and moreover the circulation is repeatedly performed, so that the effects of bubble micronization and suppressed oil separation can be substantially enhanced. Moreover, as mentioned above, the circulation of the grease lowers the viscosity of the grease, thereby enhancing pumpability of the grease.

The embodiment requires no storage tank for grease as disclosed in Patent Literature 2 and can, with a simple structure, be used for grease supply using a compact 1-3 kg grease can having no standardized size.

It is to be understood that a grease pump unit according to the invention is not limited to the above embodiment and that various changes and modifications may be made without departing from the scope of the invention.

INDUSTRIAL APPLICABILITY

A grease pump unit according to the invention can be suitably used when grease with bubbles therein being micronized is supplied to a metering valve at oiling site, a portion of the grease not discharged through the metering valve can be returned into the grease can to prevent the grease from undergoing oil separation in the grease can and in the supply pipe.

The invention claimed is:

1. A grease pump unit comprising:
   a grease supplying device with a pedestal on which a grease can is installed, a lifter standing on said pedestal, a pump device vertically moved by the lifter and a suction tube of said pump device extending through a follower plate airtightly fitted into said grease can, the grease in said grease can being sucked into said suction tube and discharged through a discharge port by activation of said pump device;
   a bubble dividing device on the pedestal for introducing the grease discharged through said discharge port through a supply pipe to micronize bubbles in the grease and for supplying the grease to the supply pipe;
   a metering valve for metering the grease supplied from said bubble dividing device to the supply pipe to discharge the grease; and
   a return pipe for returning a portion of the grease not discharged through the metering valve into said grease can via said follower plate.

2. The grease pump unit as claimed in claim 1 wherein said metering valve comprises a single valve body, said return pipe being connected to the supply pipe which connects said single valve body with said bubble dividing device, at a position adjacent to a supply port of said valve body.

3. The grease pump unit as claimed in claim 1 wherein said metering valve comprises a plurality of valve bodies connected in series by a manifold, said return pipe being connected to an outlet of the manifold.

4. The grease pump unit as claimed in claim 1 wherein said return pipe is opened at a position adjacent to a bottom of the grease can.

5. The grease pump unit as claimed in claim 1 wherein said return pipe is opened at a position below the through portion of the follower plate.

* * * * *